(12) United States Patent
Ehrhardt et al.

(10) Patent No.: US 8,080,991 B2
(45) Date of Patent: Dec. 20, 2011

(54) SENSOR DEVICE FOR MEASURING ROTATIONAL MOVEMENTS OF A WHEEL BEARING

(75) Inventors: Uwe Ehrhardt, Ostfildern (DE); Markus Kienzle, Lehrensteinsfeld (DE); Matthias Waibler, Remshalden-Hebsack (DE); Peter Guse, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 12/514,760

(22) PCT Filed: Dec. 12, 2007

(86) PCT No.: PCT/EP2007/063795
§ 371 (c)(1),
(2), (4) Date: May 13, 2009

(87) PCT Pub. No.: WO2008/080783
PCT Pub. Date: Jul. 10, 2008

(65) Prior Publication Data
US 2010/0060271 A1    Mar. 11, 2010

(30) Foreign Application Priority Data
Jan. 4, 2007   (DE) .......................... 10 2007 001 118

(51) Int. Cl.
*G01P 3/481* (2006.01)
*G01D 5/244* (2006.01)

(52) U.S. Cl. ................................. 324/207.25

(58) Field of Classification Search .................. None
See application file for complete search history.

(56) References Cited

U.S. PATENT DOCUMENTS

| | | | |
|---|---|---|---|
| 4,069,435 A | | 1/1978 | Wannerskog et al. |
| 4,259,637 A | * | 3/1981 | Bloomfield et al. .......... 324/166 |
| 4,893,007 A | | 1/1990 | Stannow et al. |
| 4,940,936 A | * | 7/1990 | Grillo et al. .................. 324/174 |
| 5,508,608 A | | 4/1996 | Goossens |
| 5,550,467 A | | 8/1996 | Goossens |
| 5,762,425 A | * | 6/1998 | Ouchi .......................... 384/448 |
| 6,429,647 B1 | * | 8/2002 | Nicholson ................. 324/207.2 |
| 6,483,296 B1 | * | 11/2002 | Hamaoka et al. ........ 324/207.25 |
| 2002/0186008 A1 | | 12/2002 | Turner |

FOREIGN PATENT DOCUMENTS

| | | |
|---|---|---|
| DE | 2 044 211 | 3/1972 |
| DE | 37 16 464 | 12/1988 |
| DE | 38 24 535 | 1/1990 |
| DE | 41 42 727 | 7/1993 |
| DE | 42 13 977 | 11/1993 |
| DE | 42 13 979 | 11/1993 |
| DE | 102 26 091 | 1/2003 |
| DE | 20 2005 005 260 | 7/2005 |
| GB | 1 604 861 | 12/1981 |
| JP | 2006266962 | 10/2006 |

* cited by examiner

*Primary Examiner* — Paresh Patel
(74) *Attorney, Agent, or Firm* — Michael J. Striker

(57) ABSTRACT

The invention relates to a sensor device for measuring rotational movements of a wheel bearing, comprising at least one runner (12) of a plain bearing (12, 14), at least one pulse generator (19), cooperating with a sensor (10) for determining a torque or a value derived thereof, wherein the pulse generator (18) is connected to the runner (12) of the plain bearing.

10 Claims, 1 Drawing Sheet

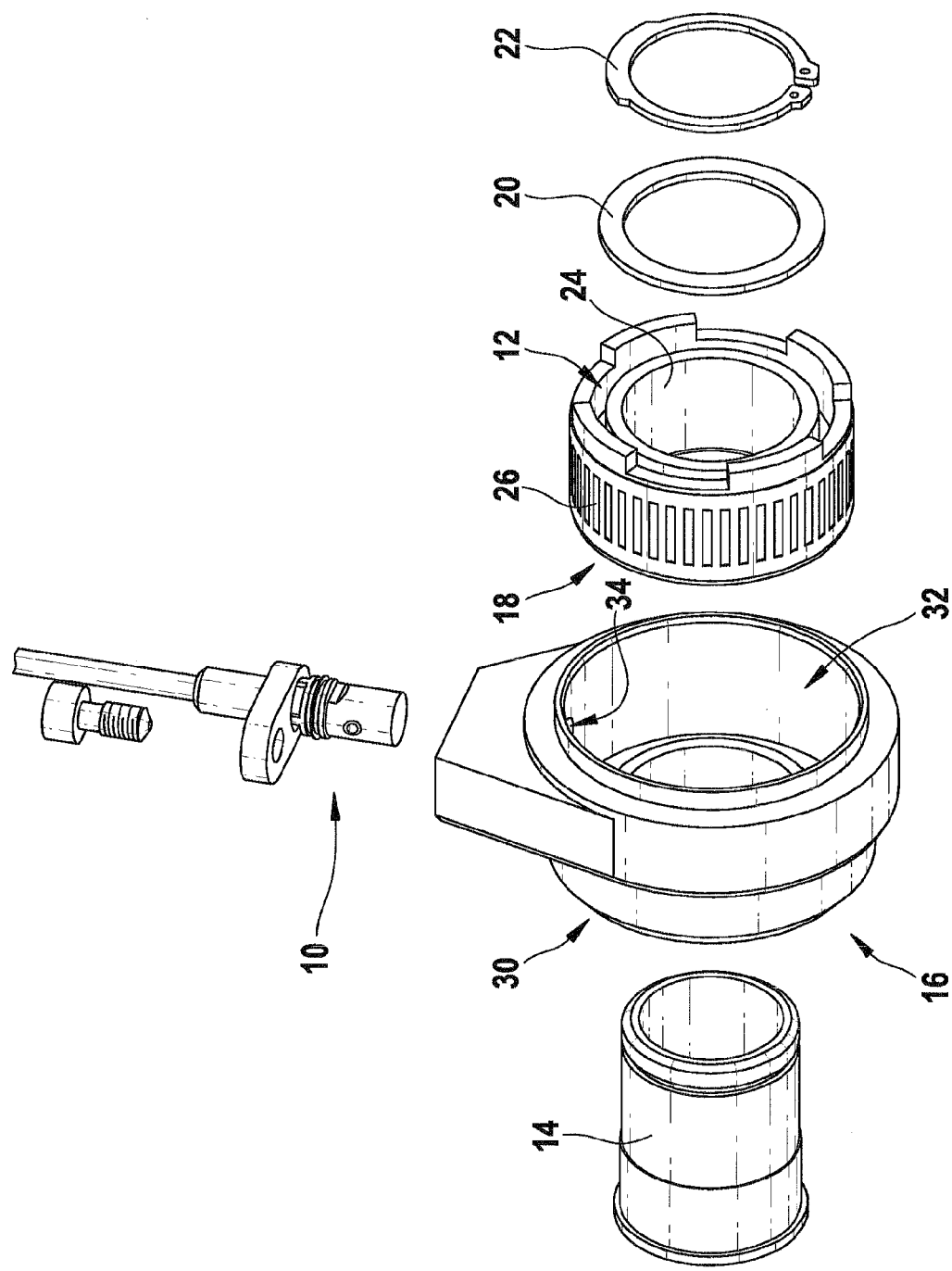

SENSOR DEVICE FOR MEASURING ROTATIONAL MOVEMENTS OF A WHEEL BEARING

The present invention is directed to a sensor device for measuring rotational motions of a wheel bearing according to the general class of the independent claim. DE 20 2005 005 260 U1 makes known a device for measuring rotational motions of a wheel bearing. It includes a signaling device on a rotating part of the bearing, which includes a stationary sensor assembly having a holding ring and a cap-shaped plastic piece which covers the bearing. The holding ring on which the cap-shaped plastic piece is mounted is pressed together with the stationary part of the wheel bearing, after a seal has been inserted.

Moreover, DE 102 26 091 A1 makes known a non-metallic encoder for an active system which is situated in a bearing, for recording wheel speeds. Magnetized, iron-containing particles are embedded in the non-metallic body. The encoder is mounted radially between inner and outer races of a wheel bearing, and axially between an interspaced pair of rollers of the bearing.

Ball bearings or roller bearings are required in both devices, however. Sensor modules that interact with bearings of this type are therefore very large in size, which makes it difficult to install them in a non-obvious manner. The object of the present invention, therefore, is to diminish the disadvantages described above. This object is achieved by the features mentioned in the independent claim.

ADVANTAGES OF THE INVENTION

According to the present invention it is provided that a pulse generator is connected to the rotor of a sliding bearing. By integrating the pulse generator directly with the rotor of the sliding bearing, it is possible to attain a particularly compact design which, due to the dimensions, may be hidden or used as a design piece, if so desired. Moreover, this integrated component which is composed of the pulse generator and the connected rotor of the sliding bearing is very easy to manufacture when, e.g. the rotor of the sliding bearing is composed of plastic and is manufactured using an injection-molding method. For example, the pulse generator may be placed in a shaping tool which is then connected to the plastic in a form-fit manner when the tool is filled with plastic melt. In this manufacturing process, it is also possible to form the sliding bearing out of plastic, thereby resulting in a particularly compact component. The number of components required, and the number of assembly steps required for a sensor module are reduced considerably.

In an advantageous development, it is provided that the rotor of the sliding bearing is composed of plastic, while the pulse generator is composed of a metallic material. Using plastic as the material to manufacture a sliding bearing makes it maintenance-free. Moreover, it is possible to then use a metallic pulse generator which influences, e.g. a magnetic field generated by a sensor, in a manner that is dependent on the rotational speed, in order to determine the rotational speed.

In an advantageous development, it is provided that the pulse generator is designed as a ring or a band in which at least one recess is formed. This recess may be punched out of the ring or band, and may therefore be manufactured in a cost-favorable manner.

Further advantageous developments result from the further dependent claims and the description.

BRIEF DESCRIPTION OF THE DRAWINGS

An exemplary embodiment of the sensor device is depicted in the drawing and is described in greater detail below.

The figure shows the design of the sensor device in a perspective illustration.

An essentially cylindrical sensor module 16 includes a first opening 30 and a second opening 32, the diameter of first opening 30 being smaller than the diameter of second opening 32. First opening 30 is used to receive a counterpart 14 which is designed as a bushing and is the stationary part of the sliding bearing relative to a movable rotor 12. After counterpart 14 is installed in first opening 30, it is fixedly connected to sensor module 16. Rotor 12 which is preferably annular in design is slid together with integrated pulse generator 26 onto counterpart 14 through second opening 32. Pulse generator 18 has the shape of a band which includes axially oriented recesses 26 situated at regular intervals. Pulse generator 18 is located on the outside of rotor 12. Rotor 12 has a cylindrical shape. A sealing element 20, e.g. a sealing ring, is installed on the end face of rotor 12. A fastening element 22 is also provided, which is also annular in design and interacts with the recesses that are integrated in rotor 12. A recess 34 which is oriented in the radial direction is also provided in sensor module 16. A sensor 10 may be slid into recess 34; sensor 10 may be provided with a screw attachment, for example, to connect it to sensor module 16.

Rotor 12 is connected to a shaft, the rotational speed or another interesting variable of which will be determined. The sensor device described above is suited, in particular, for measuring rotational motions of a bearing, preferably of motorcycles. The rotational speed of the rotating shaft is detected in a known manner. For example, pulse generator 18 influences a magnetic field, and this change is registered by sensor 10. When the geometry of pulse generator 18 is known, the change in the magnetic field may be used to deduce the rotational speed at which rotor 12 and integrated pulse generator 18 rotate relative to sensor 10.

To keep the design of the sensor device as compact as possible, pulse generator 18 is supported by a sliding bearing which is composed of rotor 12 and counterpart 14. Rotor 12 is composed of plastic in which pulse generator 18 is embedded. Counterpart 14 may also be composed of plastic or even of metal. It is essential, in particular, to design rotor 12 as a plastic piece, to reduce wear. Pulse generator 18 which is integrated in rotor 12 may then be designed as a metal part in order to influence the magnetic field in a targeted manner. Pulse generator 18 is designed, e.g. in the shape of a ring or a band. To influence the magnetic field, recesses 26 are provided in the circumferential direction. Pulse generator 18 may be manufactured very easily as a punched part.

The sliding bearing described above which includes an integrated pulse generator 18 may be manufactured preferably using a plastic-shaping method, e.g. injection molding. Pulse generator 18 which is preferably designed as a metal band having punched-out areas 26 is placed in the shaping tool. Finally, the pulse generator is connected in a form-fit manner to the plastic of rotor 12 when the tool is filled with plastic melt. In this manufacturing process, the sliding bearing is also formed simultaneously out of plastic, thereby resulting in a compact component.

Sensor module 16 is now used to accommodate counterpart 14. Counterpart 14 is inserted into first opening 30, thereby fixedly connecting it to sensor module 16. Furthermore, sensor module 16 includes recess 34 in which sensor 10 is inserted and is connected to sensor module 16. Rotor 12 is placed on counterpart 14 from the other side, through second opening 32.

Using the device described above, it is possible to easily manufacture a maintenance-free sliding bearing by embedding pulse generator 18, in the form of a band, directly in one working step during manufacture. A device of this type is very compact in design, thereby enabling it to be hidden or to be used as a design piece, if so desired.

What is claimed is:

1. A sensor device for measuring rotational motions, comprising
    at least one sliding bearing which is composed of at least one rotor (12) and at least one counterpart (14) on which the rotor (12) is supported in a sliding manner,
    at least one sensor (10) for detecting a rotational motion,
    at least one pulse generator (18) which interacts with the sensor (10) fixedly situated opposite the pulse generator (18), in order to detect the rotational motion,
    wherein the rotor (12) of the slide bearing is composed of plastic and wherein the pulse generator (18) is embedded in said plastic and thereby connected to the rotor (12).

2. The device as recited in claim 1, wherein the pulse generator (18) is designed as a ring or a band.

3. The device as recited in claim 1, wherein the pulse generator (18) is composed of metal.

4. The device as recited in claim 1, wherein the pulse generator (18) includes at least one recess (26).

5. The device as recited in one of the preceding claims, wherein in the rotor (12), the pulse generator (18) is enclosed in a coating applied via injection molding.

6. The device as recited in claim 1, wherein a sensor module (16) is provided to accommodate an element selected from the group consisting of the sensor (10), a counterpart (14) and both.

7. The device as recited in claim 1, wherein at least one sealing means (20) is provided to seal the sliding bearing.

8. The device as recited in claim 1, wherein at least one fastening means (22) is provided to attach the rotor (12) to a moving part.

9. The device as recited in claim 1, wherein the rotor (12) is connected to an axle of a motor vehicle.

10. The device as recited in claim 9, wherein the motor vehicle is a motorcycle.

* * * * *